United States Patent [19]

Kirkbride et al.

[11] 4,088,471
[45] May 9, 1978

[54] APPARATUS FOR COATING GLASS

[75] Inventors: Bernard James Kirkbride, Wigan; Robert Andrew Downey, Burscough; Charles Victor Thomasson, Preston; Joseph Earle Lewis, Burscough, all of England

[73] Assignee: Pilkington Brothers Limited, St. Helens, England

[21] Appl. No.: 749,716

[22] Filed: Dec. 13, 1976

Related U.S. Application Data

[62] Division of Ser. No. 585,522, Jun. 10, 1975, Pat. No. 4,019,887.

[30] Foreign Application Priority Data

Jun. 14, 1974   United Kingdom ............... 26522/74

[51] Int. Cl.² ............................................. C03C 17/00
[52] U.S. Cl. ..................................... 65/182 R; 65/356; 118/49
[58] Field of Search ................. 65/60 C, 60 R, 182 R, 65/356; 118/48, 49

[56] References Cited

U.S. PATENT DOCUMENTS

| 3,622,295 | 11/1971 | Loukes et al. | 65/182 R X |
| 3,674,453 | 7/1972 | Loukes et al. | 65/60 R X |
| 3,681,042 | 8/1972 | Edwards et al. | 65/182 R X |
| 3,888,649 | 6/1975 | Simhan | 65/60 R X |

Primary Examiner—Robert L. Lindsay, Jr.
Attorney, Agent, or Firm—Burns, Doane, Swecker & Mathis

[57] ABSTRACT

An apparatus for coating glass with a coating consisting of or containing silicon includes a gas distributor for locating transversely of the path of travel of a glass surface. A gas supply duct supplies coating material in gaseous form and the temperature of the duct is controlled. An elongated open-faced chamber positioned adjacent the glass path of travel communicates along its length with the duct through a gas-flow restrictor that provides gas release from the duct into the chamber at constant pressure along the length of the chamber.

6 Claims, 12 Drawing Figures

APPARATUS FOR COATING GLASS

This is a division, of Application Ser. No. 585,522, filed June 10, 1975 now U.S. Pat. No. 4,019,887 granted Apr. 26, 1977.

BACKGROUND OF THE INVENTION

This invention relates to the coating of glass and in particular to a method for the coating of glass with silicon, and to silicon-coated glass, in particular flat glass having a uniform coating comprising elemental silicon on one or both surfaces. The invention further relates to apparatus for coating glass constructed to supply coating material in gaseous form to the vicinity of a glass surface to be coated.

A variety of coating materials have been used or have been proposed for modifying the radiation transmission and reflection characteristics of glass, for enhancing the appearance of glass, or for providing decorative patterns on a glass surface. Such coatings often serve more than one purpose. For example, metal oxide coatings and vacuum-evaporated metal coatings have been used to endow glass with solar control properties while at the same time giving the glass an attractive hue.

It is known that silanes decompose on heating to produce silicon. Thus silanes have been used as a source for the production of silicon for use in electro-conductive devices.

It is a main object of the present invention to provide a coating for glass which can be applied economically, has good solar control properties, and a pleasing appearance, to add to the range of solar control coated glass already available, particularly for window glazing applications.

The invention is based on the discovery that a silicon coating can be formed on a hot glass surface, for example on a continuous ribbon of hot glass, by an economical process which provides a durable and uniform coating with desirable solar control properties and a pleasing and uniform appearance.

SUMMARY

The invention provides a method of coating glass in which the glass is moved past a coating station while the temperature of the glass is at least 400° C. Silane-containing gas is supplied to the coating station, and is released close to the glass surface at a substantially constant pressure across the glass surface into a hot zone opening towards and extending across the glass surface. Non-oxidising conditions are maintained in said hot zone. A coating consisting of or including silicon is produced on the glass by pyrolysis of the gas.

The composition of the gas may be regulated to maintain a rate of silane pyrolysis on the hot glass surface producing a silicon coating of predetermined thickness on that surface.

Usually the gas flow rate is regulated to obtain a uniform coating and the silane concentration in the gas is regulated to provide the desired coating thickness.

The temperature of the glass surface should be above 400° C in order to decompose the silane on that surface, but may be considerably higher, for example up to 750° C.

However, the use of high temperatures may result in distortion in the coated glass and tends to produce a coated glass having an opalescent or hazy surface appearance. We prefer to use a temperature below 700° C, preferably in the range 500° C to 700° C, unless distortion and/or haziness in the coated product is acceptable.

The method of the invention may be employed for coating a surface of a ribbon of glass advancing past the coating station, and the composition of the gas is regulated in relation to the speed of advance of the ribbon.

For coating a ribbon of glass which is being advanced along a bath of molten metal over which a protective atmosphere is maintained, the silane-containing gas is preferably released into the hot zone which is located where the glass temperature is in the range 600° C to 670° C.

The method of the invention enables a uniform coating of silicon of desired thickness to be produced on a moving glass surface by control of the process conditions. In practice, when treating a newly-produced ribbon of glass on line, the rate of movement of glass past the coating station is generally dictated by glass-making considerations. We have found that a convenient procedure for producing a uniform coating of desired thickness is to adjust the gas flow rate until a uniform coating is obtained and then to adjust the concentration of silane in the gas until the desired thickness of coating is obtained. However, the thickness may be controlled in other ways. For example, the temperature of the glass may be increased to increase the thickness of the coating produced. When treating a moving ribbon of glass on-line in the production process this may involve moving the coating station along the ribbon. It will be appreciated that this is not always convenient.

A silicon coating may also be applied by the method of the invention to either or both surfaces of a ribbon of glass which is being annealed and the method also provides for the coating of a ribbon of glass which is advancing through an annealing lehr, the silane-containing gas being released into a hot zone which is located in the lehr where the glass temperature is in the range 400° C to 700° C.

Thus the process of the invention is applicable to the treatment of rolled plate glass in the lehr. When treating rolled plate glass, haze or distortion in the final product may be acceptable and it may therefore be possible to work at temperatures above 700° C, for example temperatures of about 750° C. The method of the invention may also be used for the on-line treatment of sheet glass.

The silane in the gas which is flowing towards and in the vicinity of the hot glass surface being coated becomes preheated before it reaches that surface. It is desirable that the temperature of the silane gas when it contacts the glass surface being coated should be as hot as is consistent with avoiding decomposition in the gaseous phase. The silane-containing gas supplied to the coating station is maintained at a temperature at which no significant decomposition occurs, certainly below 400° C, until it is being released into the immediate vicinity of the hot glass surface.

The method of the invention is especially applicable for the deposition of coatings consisting essentially of silicon, but it may also be used for the deposition of coatings containing silicon and other materials. Thus, for example, the silane-containing gas may also contain gaseous precursors for other coating materials, which may or may not react with silicon deposited from the silane. The method of the invention may be used to apply coatings to clear glass or coloured glass, for example, the brown, grey or green body-coloured glasses which are commercially available.

Preferably the silane-containing gas comprises from 0.1% to 20% by volume of silane, up to 10% by volume of hydrogen, and from 70% to 99.9% by volume of inert gas. The silane may be monosilane ($SiH_4$).

Further the invention provides apparatus for coating glass comprising a gas distributor for locating transversely of the path of travel of a glass surface to be coated, including a gas supply duct for supplying coating material in gaseous form, means for controlling the temperature of the duct, and an elongated open-faced chamber for positioning adjacent said path and communicating along its length with the gas supply duct through gas-flow restrictor means arranged to provide gas release from the duct into the chamber at a constant pressure along the length of the chamber.

The means for controlling the temperature of the duct may be means for cooling the duct.

The apparatus of the invention is especially suitable for producing a silicon coating from a silane-containing gas, but it may also be used for the production of other coatings by deposition from the gas phase.

The gas-flow restrictor means may be constituted by an array of small cross-sectional area channels leading from the gas supply duct to the chamber, the dimensions of which channels are selected so that the pressure drop along the duct is small compared to the pressure drop along the channels.

Thermal insulation may be provided between the duct and the chamber. By provision of thermal insulation, the gas supply duct and the gas-flow restrictor means may be kept cool to avoid decomposition of the silane in the gaseous phase in the duct or on the restrictor while the gas is rapidly heated in the chamber prior to its contact with the glass surface after its release into that chamber at a constant pressure along the length of the chamber. Moreover the provision of thermal insulation limits the cooling of the walls defining the chamber by means cooling the duct and permits improved control of the conditions in the chamber.

Such apparatus may be used, for example to provide a uniform silicon coating on a ribbon of float glass 3 m wide.

The side walls of the chamber may be shaped to define a channel in the chamber diverging from the restrictor means to the open face of the chamber.

The provision of shaped side walls for the chamber controls the gas flow pattern within the chamber. The gas flow pattern is also dependent upon other parameters such as the temperature of the glass surface, the temperature of the silane-containing gas released into the chamber, and the speed of the glass surface past the open face of the chamber. By controlling the various parameters, the gas flow pattern can be controlled to achieve uniform coatings and effective silane usage while substantially avoiding silane decomposition in the gaseous phase.

When using silane to apply a silicon coating to a ribbon of glass advancing along a molten metal bath, the temperature of the gas supply duct should be controlled so that the silane-containing gas is maintained at a temperature well below 400° C before it flows through the gas-flow restrictor means into the outlet chamber. The means for controlling the temperature of the duct may comprise a jacket for heating or cooling fluid in thermal contact with the gas supply duct. To cool the duct, water may be circulated through the jacket to maintain the gas at about the temperature of the cooling water. Cooling of the distributor also serves to alleviate bowing of the distributor and setting-up problems which arise from such bowing.

The invention provides a method of forming on a hot ribbon of glass, a uniform and durable silicon coating which endows the glass with desirable solar control properties and a pleasing appearance. Thus the invention also provides, as new products, a ribbon of glass having a substantially uniform cooling comprising elemental silicon thereon, and pieces of coated glass cut from the ribbon. The coating may consist essentially of silicon.

The coating may have a thickness of 250A to 600A determined as herein described. Further the coating may have a thickness in the range 300A to 450A determined as herein described.

Further the invention comprehends a glazing unit comprising a sheet of glass having a coating containing elemental silicon on a major surface thereof, and a frame for that sheet. When the sheet is directly glazed in a wall, the frame is constituted by the edges of the walls surrounding the sheet.

The coating may have a thickness in the range 250A to 600A determined as herein described. The thickness of the coating may be in the range 300A to 450A.

The invention also includes a multiple-glazing unit comprising at least two sheets of glazing material in parallel spaced relationship, at least one sheet being a sheet of glass having a coating comprising elemental silicon thereon. The silicon coating may be disposed internally of the unit, but not necessarily so.

The invention further provides silicon-coated flat glass having a uniform silicon coating of optical thickness in the range 950A to 1600A and a refractive index in the range 3.0 to 4.0. Such silicon coatings, when coated on clear glass, typically provide a coated glass having, when viewed from the coated side, a white light transmission in the range 17% to 34%, (determined using a C.I.E. Illuminant C source) a direct solar heat transmission in the range 27% to 45% and a solar radiant reflection in the range 34% to 52%.

The invention also comprehends flat glass having a coating comprising silicon thereon whenever produced by the method of the invention.

BRIEF DESCRIPTION OF THE DRAWINGS

Some embodiments of the invention will now be described, by way of example, with reference to the accompanying drawings in which.

In the drawings the same references indicate the same or similar parts.

DESCRIPTION OF THE PREFERRED EMBODIMENTS

FIGS. 1 to 6 illustrate a preferred form of apparatus according to the invention for use in applying a uniform thin coating of silicon to the upper surface of a ribbon of float glass. The coating is applied towards the outlet end of the bath as the ribbon approaches the location where it is lifted from the surface of a bath of molten metal on which the ribbon has been formed.

Figure 1:
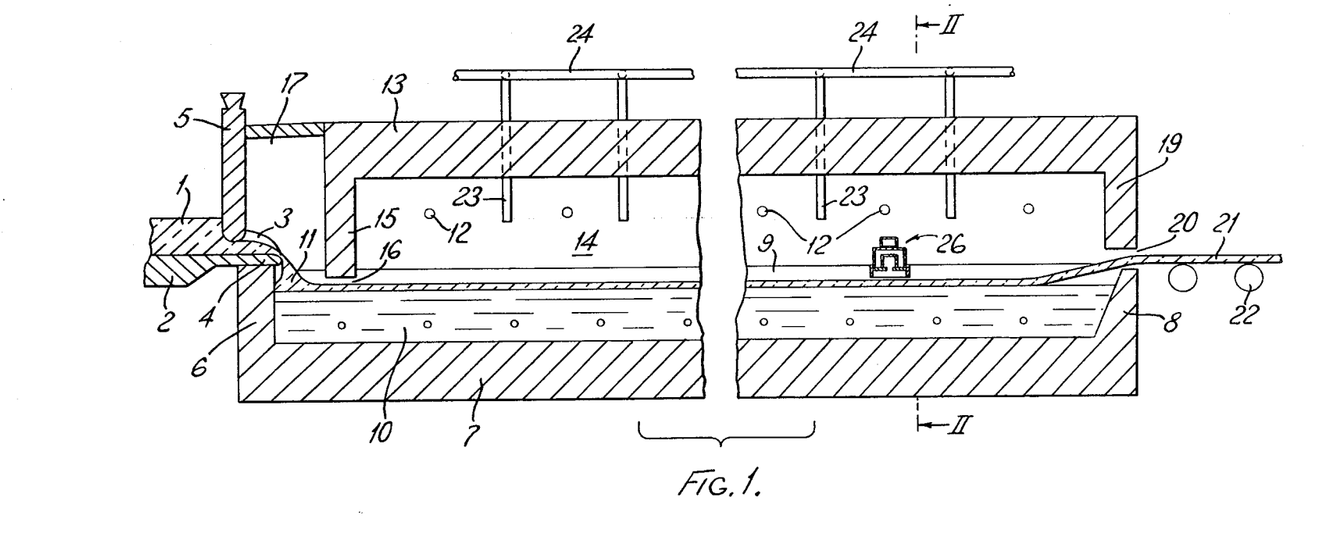
FIG. 1 is a vertical section through float glass manufacturing apparatus showing a tank structure containing a molten metal bath and a gas distributor according to the invention located transversely of the path of travel of the ribbon of glass near the outlet end of the apparatus.
Figure 2:
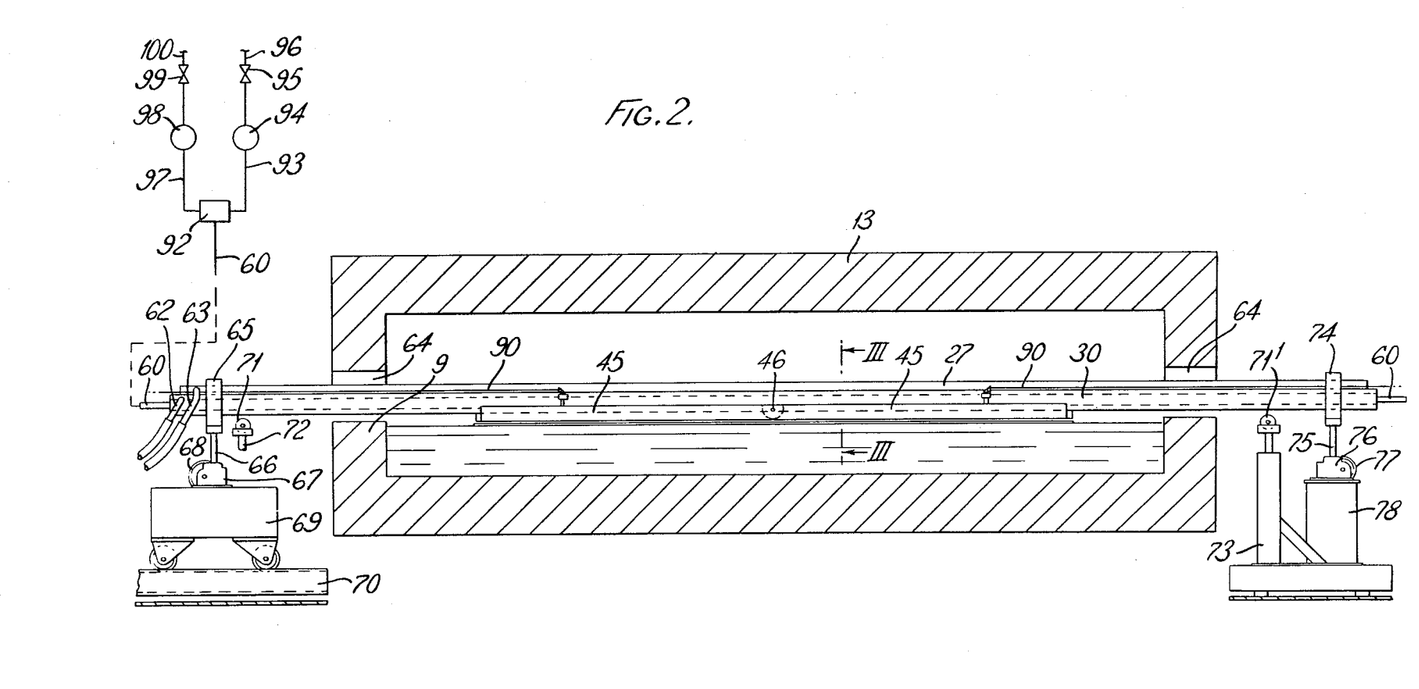
FIG. 2 is a section on line II—II of FIG. 1.

FIGS. 1 and 2 illustrate molten glass 1 being delivered in conventional manner along a canal 2 leading from the forehearth of a glass melting furnace. The canal 2 terminates in a spout having side jambs 3 and a lip 4 and flow of molten glass to the spout, usually soda-lime-silica glass, is controlled by a regulating tweel 5. The spout extends over the inlet end wall 6 of a tank structure comprising a floor 7, an outlet end wall 8 and side walls 9. The tank structure contains the bath of molten metal 10, usually molten tin or tin alloy in which tin predominates, and molten glass flows as indicated at 11 over the spout lip 4 onto the surface of the molten metal bath 10 at the inlet end of the bath where the temperature is maintained in the region of 1,000° C by heaters, indicated at 12, mounted in a roof structure 13 which is supported over the tank structure and defines a head space 14 above the molten metal bath. The roof structure has an inlet end wall 15 which depends downwardly close to the surface of the molten metal bath 10 at the inlet end of the bath to provide an inlet 16 of restricted height. An extension 17 of the roof structure extends up to the tweel 7 to provide a chamber in which the spout is enclosed.

The roof structure also has a downwardly depending wall 19 at the outlet end. An outlet 20 for a ribbon of glass 21 produced on the bath is defined between the lower face of the outlet end wall 19 of the roof structure and the upper face of the outlet end wall 8 of the bath. Driven traction rollers 22 are mounted beyond the outlet 20 with the upper surfaces of the rollers just above the level of the upper surface of the bath end wall 8 so that the ribbon of glass is lifted gently from the bath surface for discharge horizontally away from the outlet 20 from the bath on the rollers 22.

A protective atmosphere, for example 95% nitrogen and 5% hydrogen, is maintained at a plenum in the head space 14 over the bath, being supplied through ducts 23 extending downwardly through the roof 13 and connected to a common header 24. Protective atmosphere flows outwardly through the inlet 16 to fill the chamber 17 enclosing the spout. A temperature gradient is maintained down the bath from a temperature of about 1,000° C at the inlet end of the bath to a temperature in the range about 570° C to 650° C at the outlet end where the ribbon of glass is discharged from the bath. At this lower temperature the glass is sufficiently stiffened to be unharmed by its contact with the traction rollers 22 but can still be lifted from the bath surface as illustrated.

The molten glass 11 which flows over the spout lip 3 onto the bath is permitted to flow laterally on the bath as illustrated in FIG. 2 to form a layer 25 of molten glass which is then advanced as a ribbon 21 which is cooled and discharged from the bath. The width of the tank structure containing the bath between the side walls 9 is greater than the width of the ribbon.

A gas distributor for supplying silane-containing gas to the surface of the glass ribbon is located transversely of the path of travel of the ribbon of glass along the bath near the outlet end of the bath as illustrated in FIGS. 1 and 2 where the temperature of the glass is in the range 570° C to 670° C.

In operation of the invention there is fed to the glass surface a silane-containing gas which comprises from 0.1% to 20% by volume of silane, up to 10% by volume of hydrogen, and from 70% to 99.9% by volume of inert gas, usually nitrogen. At temperatures within the range 570° C to 670° C the silane in the gas readily decomposes by pyrolysis on the hot glass surface leaving a deposit of silicon Si on the glass surface. Preferably the silane is monosilane $SiH_4$.

The gas distributor is indicated generally by the reference 26 in FIG. 1 and is illustrated in more detail in FIGS. 3 to 6. The distributor comprises a hollow channel section 27 which is welded at 28 to the roof 29 of a larger inverted U-section channel member which also has side walls 30. The hollow channel section 27 serves as a duct 31 for the passage of cooling fluid, usually water.

Figure 3:
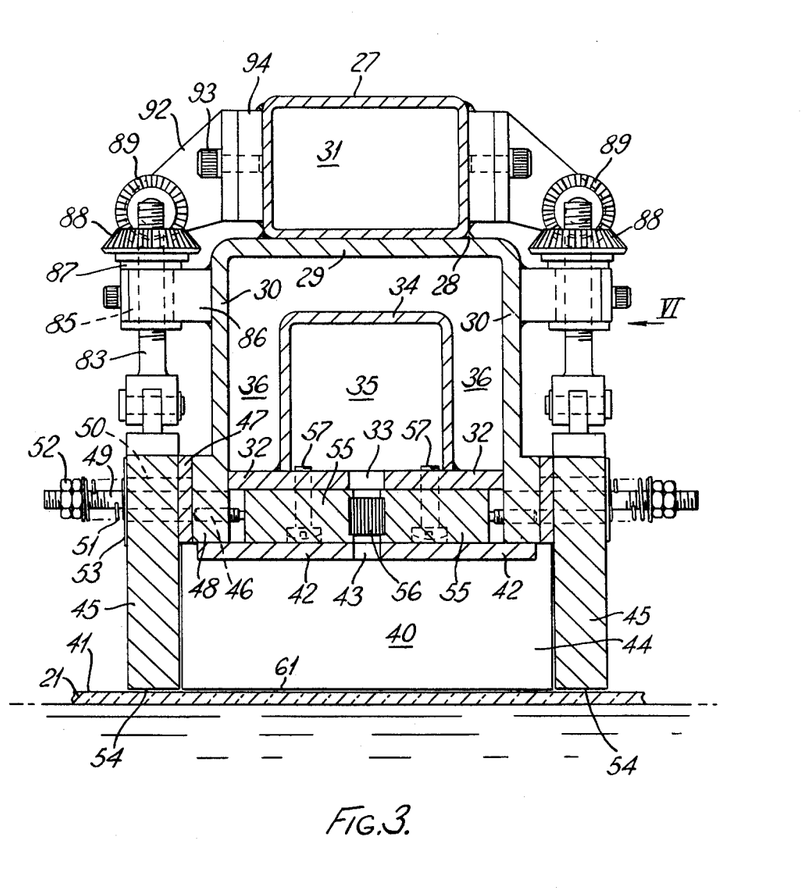
FIG. 3 is a section on line III—III of FIG. 2 showing more detail of the gas distributor.

Horizontal members 32 extend inwardly from each of the side walls 30 along the whole length of those side walls and the inner edges of the members 32 define between them an elongate slot-shaped aperture 33.

Another inverted U-section member 34 is fitted symmetrically on to the horizontal members 32 covering the aperture 33. The lower edges of the member 34 are welded to the horizontal members 32 and the member 34 defines a gas supply duct 35 with the outlet aperture 33 in its lower face.

Between the member 34 and the member 29, 30 there is defined a further channel 36 of inverted U-shape for flow of cooling water.

The distributor also defines an elongate open-faced chamber 40 for positioning adjacent the path of travel of the upper surface 41 of the ribbon of glass 21 and communicating along its length with the gas supply duct 35.

In the embodiment of FIGS. 1 to 6 the open-faced chamber has a roof defined by slabs 42 of compressed mineral fibre thermal insulation material which define between them an elongate aperture 43 which is aligned with the aperture 33 in the floor of the gas supply duct 35. The ends of the chamber 40 are closed by carbon end walls 44, and each side wall of the chamber 40 is formed by two carbon slabs 45 which are connected together by a central pivot 46, FIG. 2, which is fixed to the side wall 30 of the duct 36.

The slabs 45 are held in position against insulating pads 47 of the same material as the slabs 42 which abut fixing plates 48 welded to the side walls 30, by bolts 49 which pass through slots 50 in the slabs and are fixed into the plates 48. A pressure spring 51 is held on each of the bolts 50 by nuts 52 and bears against an eye plate 53 on the outer face of the slab. This arrangement permits adjustment of the slabs 45 in the manner to be described so that the bottom faces 54 of the slabs are set-up as closely adjacent the upper surface of the ribbon of glass as possible across the whole width of the ribbon.

Gas-flow restrictor means is fixed between the apertures 33 and 43 and comprises support plates 55 which carry a central waffle plate 56 made up of crimped metal sheets. The support plates 55 are bolted to the horizontal members 32 by bolts 57 whose heads are countersunk into the plates 55 and are covered by the insulating slabs 42 which are secured by a suitable adhesive to the plates 55. The central waffle plate 56 comprises, as illustrated in detail in FIG. 5, a plurality of crimped metal strips 58 arranged "out-of-phase" to define a plurality of channels 59 which are of small cross-sectional area relative to the cross-sectional area of the gas supply duct 35 so that when silane-containing gas is supplied under pressure to the duct 35 through gas supply ducts 60 at either end of the distributor as illustrated in FIG. 2, the pressure drop along the duct 35 is small compared with the pressure drop through the restricted channels 59 and the waffle plate 56 effectively constitutes gas-flow restrictor means to ensure release of cool silane-containing gas into the outlet chamber 40 at a substantially constant pressure and temperature along the whole length of the outlet chamber.

The support plates 55 in which the waffle plate 56 is mounted are also of metal which is in intimate contact with the cooled horizontal members 32 so that the waffle plate 56 is kept at a temperature below 400° C despite the fact that the distributor is located within the headspace at the outlet end of the float glass manufacturing apparatus where the ambient temperature is slightly below the ribbon temperature.

It is desirable however that the outlet chamber 40 shall be heated by radiation from the upper surface 41 of the ribbon of glass 21 which is passing beneath the open face of the outlet chamber, the distributor being so located, as illustrated in FIG. 3, that the lower edge 61 of the outlet chamber is located closely adjacent the upper surface 41 of the ribbon 21 which is to receive a silicon coating.

The provision of the thermally insulating slabs 42 ensures that the gas supply duct 35 and the waffle plate 56 can be maintained at a temperature below 400° C so that silane does not decompose to deposit silicon either on the inner surface of the duct 35 or on the waffle plate 56. The carbon walls of the chamber 40 are maintained substantially at the ambient temperature so that the space within the chamber 40 constitutes a heating zone into which cooled silane-containing gas is released at a substantially constant temperature and pressure across the glass surface.

Cooling water is supplied to one end of the gas distributor, outside the tank structure, as illustrated in FIG. 2. A water supply pipe 62 is connected to the duct 36 and water flows along the duct 36 to the other end of the distributor and then through a hole, not shown, in the roof 29 and in the floor of the hollow channel section 27 into the upper duct 31 within the member 27. The water flows along the duct 31 to a discharge pipe 63 at the same end of the distributor as the water supply pipe 62.

The supply of cooling water in this way cools the members 27, 29, 30 and 34 so that rigidity of the gas distributor is preserved and the silane-containing gas flowing through the gas duct 35 is kept at about the temperature of the cooling water say 40° C to 50° C.

FIG. 2 shows how the chamber 40 at the bottom of the gas distributor is located only in a central part of the distributor and is as long as the widest ribbon to be coated during its advance along the bath. The aperture 33 therefore extends only over a central part of the gas supply duct 35 and towards both ends of the duct, that is beyond the chamber 40 the gas supply duct 35 and the cooling water duct 36 have a continuous floor constituted by a continuous plate which is welded to the side walls 30.

The gas distributor is adjustably supported in the tank structure in the manner illustrated in FIG. 2 and is sealed into apertures 64 in the side walls 9 of the tank structure. For setting-up of the gas distributor the apertures 64 are unsealed and the gas distributor is run across the tank structure from one side which is the left-hand side as illustrated in FIG. 2. The left-hand side of the distributor is held in a collar 65 which is mounted on a swivel on the upper end of a threaded support rod 66 the lower end of which engages a worm gear in a housing 67, which gear is manually rotatable by a wheel 68. The housing 67 is carried on a beam trolley 69 which runs on a beam leading track 70 only a short length of which is shown. A loading roller 71 mounted at the upper end of a support 72 is vertically adjustable so as to provide support for the distributor as it is run-in from the left-hand side of the tank structure.

The distributor is guided across the tank structure on to a similar loading roller 71[1] which is mounted on the upper end of an adjustable support 73. The right-hand end of the distributor is run through a collar 74 which is similarly mounted to the collar 65 on a threaded rod 75 engaging with a worm gear in a housing 76 which worm gear is manually adjustable by a wheel 77. The housing 76 is mounted on a fixed support 78.

In setting-up the distributor when it has been run right through the tank structure and is secured between the collars 65 and 74, the wheels 68 and 77 are rotated to lift the distributor from the loading rollers 71, 71[1]. Rotation of the wheels 68 and 78 also permits adjustment to level up the distributor across the tank structure so that the lower faces 54 of the side walls 45 are set-up as closely adjacent the upper surface of the ribbon of glass as possible. In practice it is preferred to support the distributor on its back whilst it is run through the tank structure. In this case, the distributor is put in upside down and subsequently inverted by rotation of the collars 65 and 74 through 180°.

Despite the cooling of the members 27, 29 and 30 which helps to preserve rigidity there is a certain bowing of the distributor and to compensate for this the slabs 45 are adjustable about their central pivots 46. This adjustment is carried out by a mechanism illustrated diagrammatically in FIG. 2 and in more detail in FIGS. 3 and 6.

Figures 4, 5, 6:
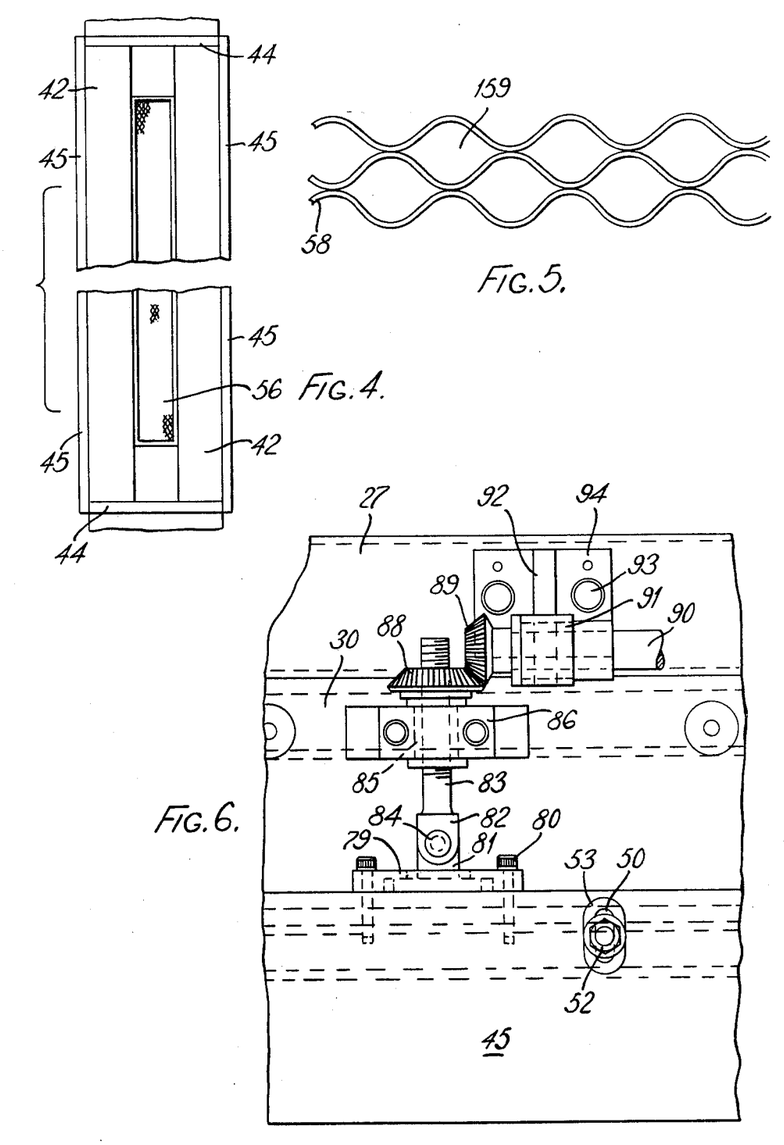
FIG. 4 is an underneath view of the distributor of FIG. 3 showing gas-flow restrictor means through which cooled gas is released into a lower open-faced chamber.
FIG. 5 is an enlargement of part of the gas-flow restrictor means.
FIG. 6 is a view in elevation in the direction of arrow VI of FIG. 3 showing a mechanism to adjust carbon side pieces on the distributor.

Each of the slabs 45 has five slots 50 through which the spring loaded holding bolts 49 pass. Adjacent the outer end of each slab, near to the second of the slots, an adjustor is fixed to the upper surface of each of the slabs to pivot the slabs about their fixed central pivot 46 within the limits of adjustment permitted by the slots 50.

Generally the slabs 45 are pivoted slightly downwardly about their central pivot 46 in order to compensate for bowing of the members 27, 29 and 30 and to bring the lower faces 54 of the side walls as near as possible to the upper surface of the ribbon across the whole width of the ribbon. Each of the adjustors comprises a metal foot plate 79 which is fixed by bolts 80 to the upper surface of its slab 45. The foot plate carries an upstanding lug 81 to which a fork 82 on the lower end of a threaded rod 83 is connected by a pivot pin 84. The threaded rod 83 passes upwardly through an eye 85 in a support bracket 86 which is welded to the outer face of the side wall 30 of the cooling water duct 36. An abutment pad 87 is fixed to the top of the bracket 86 and the rod 83 passes upwardly through that pad and has screwed on to it an internally threaded bevel gear 88 which meshes with a bevel gear 89 which is fixed to the end of a horizontally mounted rod 90 which is held in a bearing block 91 mounted on a fin 92 which is fixed by bolts 93 to a bracket 94 welded to the outer face of the hollow channel section 27. As shown in FIG. 2 each of the rods 90 extends alongside the channel section 27 through the tank side wall and is held in a second bearing block, not shown, in the collar, respectively 65 and 74, and the outer end of each of the rods 90 is formed as a nut for engagement by a tool for rotating the rod to cause raising or lowering of the slabs 45 about their pivots. Each of the gas supply ducts 60 is connected as shown at the left-hand side of FIG. 2 to a mixer 92 which is connected by a gas supply line 93 through a flow meter 94 and an adjustable valve 95 to a line 96 which is connected to a supply of gaseous monosilane $SiH_4$ in nitrogen. A second gas supply line 97 is connected to the mixer 92 and through a flow meter 98 to an adjustable valve 99 connected by a gas supply line 100 to a supply of a mixture of nitrogen and hydrogen whose composition is adjustable.

Regulation of the valves 95 and 99 permits the composition of the silane-containing gas supplied to the ducts 60 to be regulated so that the gas comprises from 0.1% to 20% by volume of silane, up to 10% by volume of hydrogen, and from 70% to 99.9% by volume of inert gas which in this instance is nitrogen. Preferably the ducts 60 at both ends of the gas distributor are connected to the mixer 92 but a separate supply may be provided for both ends of the distributor. Whilst, in the embodiment described, gas is supplied at both ends of the distributor, it may be sufficient to supply gas to the duct at one point. Valves in the gas supply are employed to regulate the rate of flow of silane-containing gas into the gas supply duct 35 and thereby to control the flow through the waffle plate 53 into the heated chamber 40 and the rate of flow of gas into the duct 35 is such as to ensure release of gas through the waffle plate and the aperture 43 into the chamber 40 at uniform pressure along the whole length of the chamber 40 to provide uniformity of treatment across the whole width of the ribbon.

The total flow rate of the silane-containing gas is regulated by adjustment of the valves 95 and 99 to provide a uniform coating and the composition of the silane-containing gas, in particular the silane concentration, is regulated by adjustment of the valve 95 in relation to the speed of advance of the ribbon of glass 21 along the bath surface beneath the open face of the chamber 40 to maintain a rate of pyrolysis of silane on the hot glass surface 41 producing a silicon coating of predetermined thickness on that surface by the time the ribbon of glass emerges from beneath the open-faced chamber. Usually in carrying out the invention the regulation of the composition of the silane-containing gas is effected in conjunction with the inspection of the product, and the setting of the valves is preserved when the desired thickness of silicon coating is being produced. The composition may be predetermined by calculation and/or experiment and fine adjustment made subsequently to achieve the desired coating thickness.

Hydrogen and nitrogen of the silane-containing gas escape through the gap defined between the lower edges 54 of the openfaced chamber and the upper surface of the ribbon of glass. It is also envisaged that a seal may be provided between the lower surface of the upstream side wall 45 of the chamber by treating the slabs 45 to enable a body of molten material, for example molten tin, to cling to the lower surface of that wall and to contact the upper surface of the ribbon of glass just before it is coated. The provision of such a seal ensures that all gas escape takes place in a downstream direction for entrainment into the general flow of protective atmosphere purging the outlet end of the bath through the outlet 20.

Extract ducts may be provided, for example slotted tubes attached to the outside of the distributor to extract spent gases from the chamber 40.

Rapid heating of the silane-containing gas is desired without decomposition in the gas phase and the heating of the gas as it flows in the outlet chamber 45 is affected by the residence time of the gas in the outlet chamber which depends on the internal volume of that chamber and its configuration.

Figure 7:
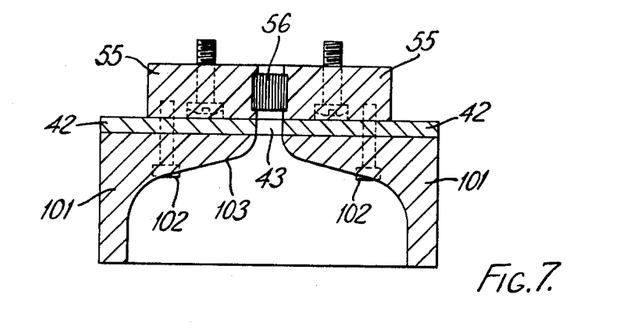
FIG. 7 is a part-section similar to FIG. 3 which illustrates a modification of the gas distributor with shaped side walls for the open-faced chamber providing a diverging shape to that chamber.
Figure 8:
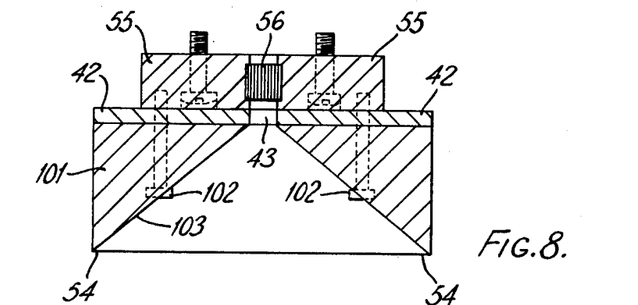
FIG. 8 is a part-section similar to FIG. 7 which illustrates yet another form of shaped side walls for the open-faced chamber of the distributor.

FIGS. 7 and 8 illustrate two alternative arrangements of the outlet chamber in which side walls 101 are thick carbon walls which are fixed by bolts 102 to the support plates 55. Intermediate slabs 42 of thermal insulation are provided. The walls 101 are shaped to define a channel in the chamber which diverges from the aperture 43 to the open face of the chamber. The inner surfaces 103 of the side walls may have a curved shape as shown in FIG. 7 with a rapidly increasing cross-section so as to provide rapid expansion of the gases flowing downwardly through the aperture 43.

A more gradule expansion and a modified flow pattern are provided in the embodiment of FIG. 8 in which the inner faces 103 of the walls 101 are straight sloping faces.

Figure 9:
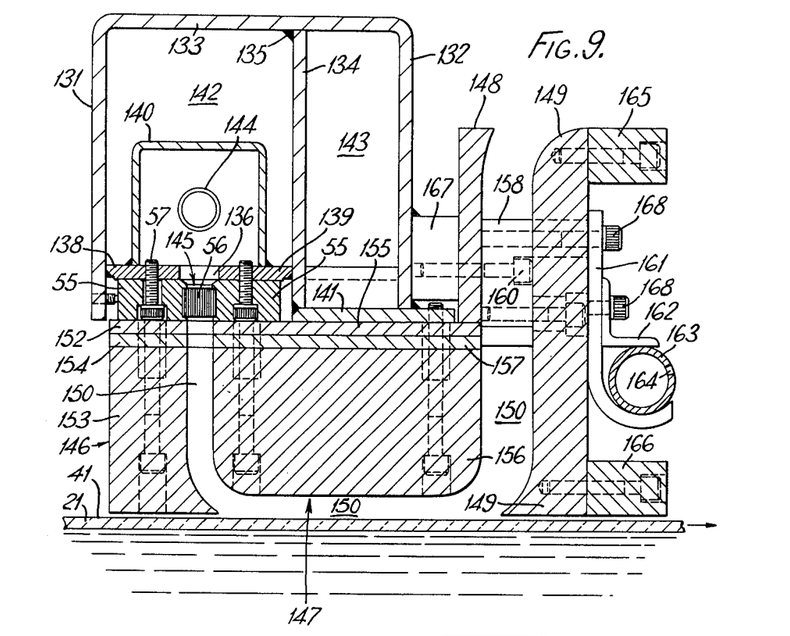
FIG. 9 is a section similar to FIG. 3 of an alternative form of gas distributor with yet another form of open-faced chamber.

Another distributor according to the invention is illustrated in FIG. 9, and has an open-faced chamber shaped for laminar flow of the coating gas parallel to the glass surface 41.

The distributor comprises an inverted U-section channel member 130 having side walls 131, 132 and a top wall 133. The channel within the 130 member is divided into two sections by a vertical partition 134 welded at 135 to the top wall 133. Horizontal members 138 and 139 extend inwardly from the side wall 131 and the partition 134 adjacent their lower edges and together define an elongated aperture 136. A second smaller U-section channel member 140 is disposed symmetrically over the aperture 136, its lower edges being welded to the horizontal members 138 and 139. A horizontal member 141 is welded to the base of the vertical partition 134 and the base of the wall 132 extends beyond the wall 132.

The two inverted U-section channel members 130 and 140, together with horizontal members 138 and 139, define a U-section duct 142 for the passage of a cooling fluid. A rectangular return duct 143 is defined by the side wall 132, the top wall 133, the partition 134 and the horizontal member 141. The interior face of U-section channel member 140, together with horizontal member 138 and 139, defines a gas supply duct 144.

Gas flow restrictor means 145, similar to that shown in FIGS. 3, 4 and 5 having a waffle plate 56 between support plates 55, is bolted to the underside of horizontal members 138 and 139 by countersunk bolts 57, so that the waffle plate 56 is aligned with aperture 136. As in the embodiment of FIG. 3, the channels in the waffle plate 56 are of small cross-sectional area relative to the area of the gas supply duct 144.

Shaped carbon blocks 146, 147, 148 and 149 define a U-shaped chamber 150 having an open face extending across the upper surface 41 of the ribbon of glass 21 to be coated. The carbon block 146 comprises upper and lower sections 152 and 153 with a layer 154 of fibrous thermal insulation bonded between them. Shaped carbon block 147 similarly comprises a laminate of upper and lower sections 155 and 156 with a layer of fibrous thermal insulation 157 bonded between them. The thermal insulation layers 154 and 157 control the flow of heat between the cooled gas supply duct and the chamber 150, allowing the carbon shapes defining the chamber walls to heat up in use.

A plurality of spaced distance pieces 167 are welded to the outer face of side wall 132 of the U-section channel member 130. The shaped carbon block 148 stands on the top face of carbon block 147 in contact with the rear faces of distance pieces 167. Spaced distance pieces 158, corresponding to distance pieces 167, are disposed in the downstream limb of the U-shaped chamber 150 and separate shaped carbon blocks 148 and 149. The distance pieces 158 and the carbon block 148 are secured to the distance pieces 167 by bolts 160 whose heads are countersunk in the distance pieces 158. The shaped carbon block 149 is secured by bolts 168 which are secured in the distance pieces 158. The bolts 168 also secure brackets 162 and 162 which extend along the distributor and support a duct 163 having an elongated aperture 164 for the supply of gas under pressure.

The faces of the carbon blocks 146, 147, 148 and 149 which define the walls of the U-shaped chamber 150 are smooth and shaped to avoid turbulence and allow laminar flow of gas over the glass surface 41. Subsidiary carbon blocks 165 and 166 are secured to the back face of shaped carbon block 149 at the top and bottom thereof to assist in controlling the gas flow. The lower subsidiary block extends horizontally close to the gas surface and restricts the flow of gas under the foot of block 149.

In use, the ducts 142 and 143 (which are interconnected by a hole in the partition 134 at one end thereof) are connected with a supply of cooling fluid and the gas supply duct 144 is connected to a source of silane gas in the same way as the apparatus of FIGS. 1 to 6. In addition, the duct 163 is connected to a source (not shown) of gas under pressure (for example, nitrogen/hydrogen) which flows through the apertures 164 and serves to disperse waste gas exiting from the U-shaped chamber 150.

Some examples of operation will now be described. Examples 1 to 4 relate to the production of a silicon coating on the upper surface of a ribbon of float glass shortly before the ribbon is discharged from the float glass manufacturing apparatus. Example 5 relates to the application of a silicon coating to a ribbon of rolled plate glass as it passes through an annealing lehr.

In the examples, the optical properties of the products are given. The thicknesses quoted for the coatings are determined from the optical thickness measurements in known manner. The white light transmissions are determined using, as the light source, C.I.E. Illuminant C. The optical properties quoted were determined from measurements made with the coating on the side of the glass facing the light source used.

EXAMPLE 1

Using the apparatus illustrated in FIGS. 1 to 6 a protective atmosphere consisting of 94% by volume nitrogen and 6% by volume hydrogen is maintained in the headspace 14 over the molten tin bath along which the ribbon of float glass is advanced.

The ribbon 21 is discharged from the apparatus by the rollers 22 at a speed of 295 meters per hour and passes through the annealing lehr which is beyond the rollers 22.

The gas distributor is located near the outlet end of the bath where the glass surface temperature is about 610° C, and is mounted with the lower edge of the outlet chamber 45 as close as possible to the upper surface 58 of the ribbon 21 without making actual contact.

A silane-containing gas consisting of 3.9% by volume monosilane $SiH_4$, 93.9% nitrogen and 2.2% hydrogen was supplied to the distributor through the ducts 57 at a rate of 90 liters per minute per meter of length of the distributor. The feed rate was adjusted until a substantially uniform silicon coating was produced on the glass at the outlet end of the lehr.

The hue of the silicon-coated glass sheets cut from the ribbon of glass appeared brown by transmitted light and silver by reflected light. The thickness, refractive index, and optical properties of the coated glass are as follows:

| | |
|---|---|
| Wavelength of maximum reflection (λ max) | 5300A |
| Refractive index | 3.73 |
| Optical Thickness | 1234A |
| Thickness | 355A |
| White light transmission | 23% |
| Direct solar heat transmission | 34% |
| Total heat transmission | 40% |
| Solar radiant reflection | 48% |

EXAMPLE 2

The procedure of Example 1 was repeated but using apparatus modified as illustrated in FIG. 7 so that the outlet chamber 45 has a special shape.

Process conditions were as follows:

| | |
|---|---|
| Composition of protective atmosphere | 94% by volume nitrogen |
| Lehr speed of ribbon | 215 meters/hour |
| Glass temperature | 640° C |
| Composition of gas mixture supplied | 2.6% by volume mono-silane $SiH_4$ 4.7% by volume hydrogen 92.7% by volume nitrogen |
| Rate of supply gas mixture | 84 liters/minute/meter of distributor length. |

A uniform silicon coating was produced and the hue of the coated glass was brown in transmitted light and silver in reflected light.

The thickness, refractive index, and optical properties of the coated glass were as follows:

| | |
|---|---|
| Wavelength of maximum reflection (λ max) | 5850A |
| Refractive index | 3.55 |
| Optical thickness | 1463A |
| Thickness | 412A |
| White light transmission | 24% |
| Direct solar heat transmission | 33% |
| Total heat transmission | 39% |
| Solar radiant reflection | 47% |

EXAMPLE 3

The procedure of Example 1 was again repeated but using a modification of the outlet chamber as illustrated in FIG. 8. The process conditions were as follows:

| | |
|---|---|
| Composition of protective atmosphere | 94% by volume nitrogen<br>6% by volume hydrogen |
| Lehr speed of ribbon | 295 meters/hour |
| Glass temperature | 650° C |
| Composition of gas mixture supplied | 2.3% by volume mono-silane SiH$_4$<br>5.2% by volume hydrogen<br>92.5% by volume nitrogen |
| Rate of supply of gas mixture | 87 liters/minute/meter of distributor length. |

A uniform coating was again produced and the hue of the coated glass was brown in transmitted light and silver in reflected light.

The thickness, refractive index of the coating and the optical properties of the glass were as follows:

| | |
|---|---|
| Wavelength of maximum reflection (λ max) | 5100A |
| Refractive index | 3.60 |
| Optical thickness | 1274A |
| Thickness | 354A |
| White light transmission | 27% |
| Direct solar heat transmission | 36% |
| Total heat transmission | 41% |
| Solar radiant reflection | 47% |

Another example of operation with the distributor of FIGS. 1 to 6 is as follows:

EXAMPLE 4

The ribbon of glass being coated was 3 m wide. The process conditions were as follows:

| | |
|---|---|
| Composition of protective atmosphere | 90% by volume nitrogen<br>10% by volume hydrogen |
| Lehr speed of ribbon | 360 meters/hour |
| Glass temperature | 660° C |
| Composition of gas mixture supplied | 2.2% by volume mono-silane SiH$_4$<br>5.6% by volume hydrogen<br>92.2% by volume nitrogen |
| Rate of supply of gas mixture | 66 liters/minute/meter of distributor length. |

A uniform coating resulted the hue of which was brown in transmitted light and silver in reflected light.

The thickness of the coating and optical properties of the coated glass were as follows:

| | |
|---|---|
| Wavelength of maximum reflection (λ max) | 4400A |
| Refractive index | 2.9 |
| Optical thickness | 1100A |
| Thickness | 380A |
| White light transmission | 36% |
| Direct solar heat transmission | 47% |
| Total heat transmission | 54% |
| Solar radiant reflection | 35% |

EXAMPLE 5

The procedure of Example 1 was repeated using the modified apparatus illustated in FIG. 9 and passing the silane-containing gas through the open-faced chamber parallel to the glass surface under substantially laminar flow conditions. The total gas flow rate was set to provide a uniform coating and the concentration of silane in the gas varied to vary the thickness of the coating whilst preserving uniformity. The process conditions were:

| | | |
|---|---|---|
| Composition of protective atmosphere | | 90% by volume nitrogen<br>10% by volume hydrogen |
| Lehr speed of ribbon | | 365 meters/hour |
| Glass temperature | | 620° C |
| Rate of supply of gas mixture | | 50 liters/minute/meter of distributor length |
| Composition of gas mixture supplied | (a) | 5% by volume mono-silane, SiH$_4$<br>95% by volume nitrogen |
| | (b) | 10% by volume mono-silane, SiH$_4$<br>90% by volume nitrogen |
| | (c) | 7% by volume mono-silane, SiH$_4$<br>3% by volume hydrogen<br>90% by volume nitrogen |

The thickness, refractive index and optical properties of the glass were:

| | 5(a) | 5(b) | 5(c) |
|---|---|---|---|
| Wavelength of maximum reflection (λ max) | 4800A | 7100A | 6000A |
| Refractive index | 3.45 | 4.00 | 3.80 |
| Optical thickness | 1190A | 1780A | 1500A |
| Thickness | 348A | 444A | 395A |
| White light transmission | 25% | 21% | 18% |
| Direct solar heat transmission | 37% | 24% | 28% |
| Total heat transmission | 43% | 31% | 34% |
| Solar radiant reflection | 43% | 54% | 52% |
| Colour in transmission | brown | green | brown |
| Colour in reflection | silver | gold | silver/gold |

As well as application of the invention to the coating of float glass during its manufacture, the method of the invention can be so be employed for coating a hot ribbon of glass produced in other ways, for example by the known rolling process or vertical drawing process in which a formed ribbon of glass is advanced through an annealing lehr. One form of gas distributor for coating a rolled ribbon of glass in an annealing lehr is illustrated diagrammatically in FIG. 10. This gas distributor would be located in the lehr where the glass temperature is in the range 400° C to 750° C. The ribbon of rolled plate glass 110 is advancing on lehr rollers indicated at 111.

Figure 10:
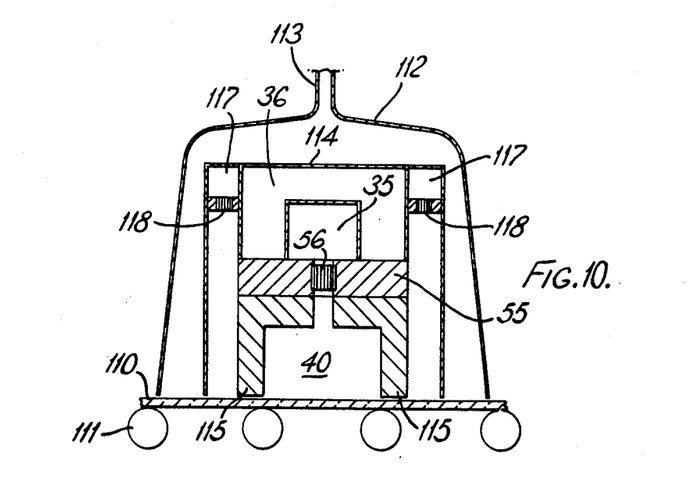
FIG. 10 is a diagrammatic cross-section through another embodiment of the invention for coating glass in an annealing lehr.

The gas distributor includes a hood 112 which is connected to an extract duct 113. The gas distributor is located under the extraction hood and the side walls of the extraction hood 112 extend downwardly close to the upper surface of the ribbon of glass 110. The glass distributor comprises a protective hood 114 in which there is defined the gas supply duct 35 surrounded by a water cooled jacket 36 in similar manner to the embodiment illustrated in FIG. 3.

Gas-flow restrictor means in the form of a waffle plate 56 made up of crimped metal sheets of the same kind as illustrated in FIG. 5. The waffle plate 56 is carried by support plates 55.

The elongate open-faced chamber 40 is defined beneath the waffle plate by carbon side pieces which are L-shaped to define an aperture in the roof of the chamber beneath the gas flow restricting waffle plate 56. The bottom of the side walls of the carbon shapes extend close to the upper surface of the ribbon of glass and this arrangement provides release of silane-containing gas into the chamber 40 at constant pressure along the length of the chamber which extends across the width of the advancing ribbon of rolled glass. In order to provide a non-oxidising atmosphere beneath the protective hood 114, protective atmosphere, for example a nitrogen atmosphere or an atmosphere consisting of 95% by volume nitrogen and 5% by volume hydrogen, is introduced through ducts 117 which are defined at the top of the hood 114 upstream and downstream of the gas distributor. Gas flow restricting means in the form of waffle plates 118 similar to the waffle plate 56 provide an outlet from each of the ducts 117 for protective atmosphere of flow downwardly at substantially constant pressure across the whole width of the distributor toward the upper surface of the ribbon of glass. In this way there is a constant flow of protective atmosphere in the region between the carbon side pieces 115 and the protective hood. Gases are extracted beneath the bottom edges of the protective hood upwardly through the extraction hood 112 to the extraction duct 113. In this way a non-oxidising atmosphere is provided in the region of the lehr where the silane coating is being produced on the upper surface of the ribbon of glass and there is continuous extraction of waste gases away from the coating zone thereby avoiding the possibility of silane-containing gases diffusing along the whole length of the annealing lehr.

A modification of the apparatus of FIG. 10 may also be used in an enviroment where there is no protective atmosphere, such as an annealing lehr, and without a protective atmosphere being supplied directly to the coating station. In this modification the ducts 117 and waffle plates 118 are omitted and the bottom of each of the carbon side pieces 115 is widened in the direction of glass advance to a dimension which substantially inhibits ingress of external atmosphere into the chamber 40.

An example of operation of this modified apparatus for coating rolled, patterned glass as it passes through an annealing lehr is as follows:

EXAMPLE 6

| | |
|---|---|
| Coated width of ribbon | 1 meter |
| Lehr Speed of Ribbon | 350 meters/hour |
| Glass temperature | 620° C |
| Composition of gas mixture supplied | 5.0% by volume monosilane SiH$_4$ |
| | 5.0% by volume hydrogen |
| | 90.0% by volume nitrogen |
| Rate of supply gas mixture | 60 Liters/minute/meter of distributor length. |

A uniform coating was produced which was brown in transmitted light, and silver in reflected light.

The optical properties of the coating are as follows:

| | |
|---|---|
| Wavelength of maximum reflection (λ max) | 4000A |
| Refractive index | 3.2 |
| Optical thickness | 1000A |
| Thickness | 312A |
| White light transmission | 33% |
| Direct solar heat transmission | 45% |
| Total heat transmission | 51% |
| Solar radiant reflection | 36% |

Also float glass may be coated in the annealing lehr through which the ribbon of float glass is advanced after it has been discharged from the bath, as long as the gas distributor is located in the lehr where the temperature of the glass is above 400° C.

The silicon-coated glass produced, when cut into sheets from the ribbon in conventional manner, had a pleasing appearance and useful solar control properties making it useful for glazing units especially for windows in buildings.

Figures 11, 12:
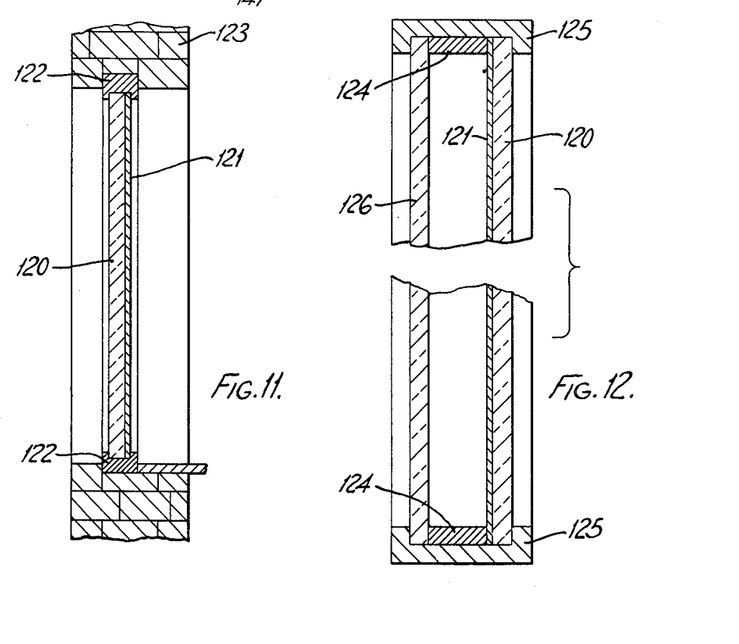
FIG. 11 is a cross-section through a glazing unit according to the invention having a single sheet of silicon-coated glass mounted in a frame.
FIG. 12 is a cross-section through a multiple glazing unit according to the invention.

FIG. 11 illustrates such a glazing unit according to the invention comprising a sheet of glass 120 having a coating of silicon 121, the thickness of which is greatly exaggerated for the sake of clarity. The sheet is mounted in a frame 122 which is fixed in a wall 123 in any conventional manner.

The silicon-coated glass may also be used in multiple-glazing units, especially double-glazing units. One such unit is illustrated in FIG. 12 and comprises a sheet of uncoated glass 126 and a sheet of glass 120 having a silicon coating 121 which, in the embodiment illustrated, is disposed internally of the unit to protect it from weathering. The sheets of glass are spaced apart by spacer elements 124 of conventional kind, the surfaces of the glass adhering to the spacer elements 124 using a suitable adhesive. The whole unit is mounted in a frame 125 for fixing into a wall in conventional manner.

The placing of the silicon coated faces of the glass internally of the double glazing unit protects the silicon coatings from weathering. In view of the durability of the silicon coatings however this may not be necessary and the silicon-coated surfaces of the glass sheet may be outside surfaces.

A coated glass sheet may constitute the inner or the outer pane of a double-glazing unit. In a multiple glazing unit comprising three or more panes the coated glass may be used as an intermediate pane or as the inner or outer pane.

For some applications where high strength glass is required it is desirable to toughen the glass by a thermal tempering process and the silicon coated glass of the invention has been thermally toughened by conventional procedures without any significant deterioration of the silicon coating. Also the coated glass can be laminated.

The pleasing appearance of the silicon coated glass also provides applications in which its solar control properties are not required, for example in interior glazing, or as a decorative and sometimes structural element in furniture. Thus for example the coated glass may constitute a table top.

The silicon coated glass may also be used as a mirror by providing a dark background to prevent light transmission through the glass, such a mirror comprising silicon-coated glass according to the invention having a dark coating, for example black paint, either on top of the silicon coating or on the opposite face of the glass.

In carrying out the invention other silanes may be employed as a constituent of the silane-containing gas, for example disilane $Si_2H_6$ or dichlorosilane $SiH_2Cl_2$.

The method of the invention has been used to form a silicon coating on flat glass having a thickness in the range 200A to 1,000A or more. Preferably the coatings are of thickness in the range 250A to 600A.

Thinner coatings within this range are silvery blue in reflected light and brown in transmitted light. As the thickness of the coating increases so there is a gradual change in its appearance so that when the thickness is about 400A the coated glass appears yellow-silver in reflected light and brown in transmitted light.

The transmission and reflection colours continue to deepen until the thickness reaches about 450A at which thickness interference colours become significant. Interference colours are not usually desirable on float glass, although they can impart attractive effects to patterned glass. Generally, for solar control, coatings on non-patterned glass are preferred having a thickness in the range 300A to 450A, coatings of uniform appearance being readily achieved within this range.

The thickness of the coating on the glass has been determined by a simple optical technique, by measuring the wavelength ($\lambda$ max) at which light reflection from the coating is a maximum (R max). Thin film theory shows:

$$R\max = \left( \frac{Nc^2 - Ng}{Nc^2 + Ng} \right)^2$$

where
Nc = refractive index of the coating
Ng = refractive index of the glass

Thus, provided the refractive index of the glass is known, the refractive index may be determined. The refractive index is related to the thickness of the coating by the equation $$Nc \cdot d = \frac{\lambda \max}{4} = \text{optical thickness}$$

where $d$ is thickness of the coating.

We claim:

1. Apparatus for coating glass, comprising a gas distributor for locating transversely of the path of travel of a glass surface to be coated, said gas distributor including an elongated gas supply duct formed with an elongated aperture for supplying coating material in gaseous form, heat exchange means mounted in heat exchange relationship with the gas supply duct for controlling the temperature of the duct, an elongated open-faced chamber for positioning with its open face adjacent the path of travel of the glass surface, which chamber has side walls defining a gas flow channel leading to said open face from an elongated aperture for gas flow into said chamber which aperture extends along the length of the chamber, and gas-flow restrictor means connecting the elongated aperture in said gas supply duct to the elongated aperture for gas flow into the chamber to ensure gas release from the gas supply duct into the chamber at a substantially constant pressure along the length of the chamber.

2. An apparatus according to claim 1, wherein the means for controlling the temperature of the duct are constituted by means for cooling the duct.

3. Apparatus according to claim 1, wherein the gas flow restrictor means is constituted by an array of small cross-sectional area channels leading from the gas supply duct to the chamber, the dimensions of which channels are selected so that the pressure drop along the duct is small compared to the pressure drop along the channels.

4. Apparatus according to claim 1, including thermal insulation between the duct and the chamber.

5. Apparatus according to claim 1, wherein the side walls of the chamber are shaped to define a channel in the chamber diverging from said restrictor means to the open face of the chamber.

6. Apparatus for coating a surface of a ribbon of glass, comprising means for transporting a ribbon of glass past a coating station, and a gas distributor at the coating station located transversely of the path of travel of the ribbon of glass, said gas distributor comprising:
an elongated gas supply duct formed with an elongated aperture along its length;
means for supplying coating material in gaseous form to said gas supply duct;
heat exchange means mounted in heat exchange relationship with the gas supply duct along its length for controlling the temperature of the duct;
an elongated open-faced chamber positioned with its elongated open face adjacent said transporting means and extending across the path of travel of the ribbon of glass along said transporting means, which chamber has side walls defining a gas flow channel leading to said elongated open face from an elongated aperture extending along the length of the chamber for gas flow into said chamber; and
gas flow restrictor means connecting the elongated aperture in the gas supply duct to the elongated aperture extending along the length of the chamber, which restrictor means is so contructed as to ensure gas release from the gas supply duct into the chamber at a substantially constant pressure along the length of the chamber.

* * * * *